Patented Oct. 13, 1925.

1,556,694

UNITED STATES PATENT OFFICE.

CLAUDE A. KING AND CARL M. WARLICK, OF DURHAM, NORTH CAROLINA, ASSIGNORS TO CLEAN WASH PAINT AND VARNISH REMOVER CO., INC., OF SYRACUSE, NEW YORK, A CORPORATION OF NEW YORK.

PAINT AND VARNISH REMOVER AND PROCESS.

No Drawing.   Application filed June 7, 1921. Serial No. 475,755.

*To all whom it may concern:*

Be it known that we, CLAUDE A. KING and CARL M. WARLICK, citizens of U. S. A., residing at Durham, North Carolina, have invented new and useful Improvements in Paint and Varnish Removers and Processes, of which the following is a specification.

The present invention relates to paint and varnish remover and to a process of removing paint and varnish from old painted surfaces which it is desired to repaint, and the said process is particularly advantageous in removing paint and varnish from metal surfaces, especially non-horizontal metal surfaces, such as the removal of the paint and varnish from automobiles which it is desired to repaint.

The composition preferably employed is made up by dissolving or mixing with water, the following ingredients, in about the proportions specified:

To one gallon of water we add four ounces of quick lime and allow the same to stand for a while, during which time the lime first slakes and becomes converted principally into calcium hydroxid, a part of which dissolves. Two ounces of common salt are then added and the mixture stirred until the same has substantially all dissolved. This will aid also in the solution of any portion of the lime which was not dissolved in the water originally used. Two pounds (32 ozs.) of "lye" (i. e., caustic soda or sodium hydroxid) are then added and the mixture stirred until the same has dissolved. We then add a small quantity of a deodorizing material capable masking the odor of the liquid, and we also add preferably a small quantity of a coloring agent. For these last two ingredients we preferably employ, say about five drops of oil of cloves and about three drops of a strong alcoholic solution (about 5 to 10%) of methylene blue in denatured alcohol. It is also advisable to add a small quantity, say about one ounce of potassium permanganate, this material acting to make the finish remover more powerful, especially when there is a considerable amount of varnish or dried linseed oil in the paint or varnish film which is to be removed.

The entire mixture is preferably then allowed to stand in a covered receptacle in order to completely clarify and in order for any insoluble materials to thoroughly separate from the clear liquor, said clear liquor being then drawn off into suitable cans or other receptacles for shipment or use.

In this paint remover composition, the lye is the most active ingredient. The lime completely decarbonates and purifies the lye and precipitates many of the impurities which are likely to be present therein and, it is advisable that the amount of lime be sufficient to leave a considerable excess of hydrated lime in solution. The salt has a peculiar effect, in that it seems to render the action of the lye on the dried paint quicker and more effective, and also it appears to exercise the function of preventing corrosion of the metal surface from which the paint and varnish have been removed. It has been demonstrated that if the salt is omitted, the metal surface, after cleaning, is left in a condition which will very readily corrode and rust, whereas the presence of the salt seems to largely prevent this effect.

The paint remover is preferably applied as follows:

We spray or brush the remover onto the surface to be cleaned in any desired manner, in the strength above stated. We then (after allowing to stand a short time, say 15 minutes or so) sprinkle a small amount of water on this surface, whereupon chemical action takes place, the paint remover apparently dissolving or saponifying the paint oils and like ingredients, which action liberates the pigment in a condition in which it is readily washed off. It is not necessary nor desirable in this step to add a large amount of water, an amount of water about equal or perhaps less than the amount of liquid paint remover being entirely suitable. We preferably at this stage rub the surface under treatment with a stiff brush, like an ordinary scrubbing brush, with stiff bristles, in order to very effectively act upon all of the ingredients of the paint or varnish possible. When the chemical action has apparently ceased (e. g. 15 minutes or so after sprinkling with water), we wash off the surface, for example, with an ordinary hose, and if necessary we subject the surface to a repetition of the same treatment. The surface is then preferably dried in any convenient manner after final washing, and the surface is smooth and ready for application of new paint.

The use of the permanganate, as above stated, is optional. In the case of the removal of finish coating from very old work, where the varnish has almost completely been worn away or has been removed by the action of rain or the like, and in the case of paints originally not containing any large amounts of linseed oil, this ingredient may be omitted. In treating surfaces in which a considerable portion of the varnish remains or in which a considerable portion of dried linseed oil remains, the permanganate seems to make the action of the remover very much quicker and very much more complete.

It will be understood that other ingredients may be added if desired, and other coloring matters may be substituted in place of the methylene blue or this ingredient may be omitted entirely. The small amount of oil of cloves may in some cases be omitted, or other oils of similar nature may be substituted. The oil of cloves seems, however, to be rather better than any of the other materials with which we have experimented, since the remover seems to act upon the finish coating quicker and more completely if this material is present. In other words, the oil of cloves, or whatever chemical compounds may be produced by interaction of this with the other ingredients, seems to have an action in removing the paint, as well as its odor-masking action.

It will be understood that minor changes in the proportions may be made without departing from the spirit of our present invention.

It is to be understood that when the quick lime reacts with water it is converted principally into calcium hydroxid, 4 parts of the former giving about 5.3 parts of the latter. In place of this, any other alkaline earth hydroxid could obviously be employed.

While we preferably employ caustic soda as the lye used, we could, of course, use potassium hydroxid or other alkali metal hydroxid.

The water used in sprinkling (second step) may be hot or cold. Hot water, if available, will accelerate the action, but cold water can be used with excellent results.

We claim:

1. A paint remover composition comprising an alkali metal hydroxid, an alkaline earth metal hydroxid, common salt, an oil capable of masking the odor, and water, the first mentioned three ingredients being present in the proportions of approximately 32:5.3:2.

2. A paint remover composition comprising an alkali metal hydroxid, an alkaline earth metal hydroxid, common salt, a soluble permanganate, an oil capable of masking the odor, and water, the first mentioned three ingredients being present in the proportions of approximately 32:5.3:2.

3. A process of removing paint or varnish coating from coated surfaces, which comprises applying to the surface a liquid comprising a concentrated solution containing an alkali metal hydroxid, also containing an alkaline earth metal hydroxid, common salt, and oil capable of masking the odor, thereafter sprinkling the surface with a small amount of aqueous liquid, allowing chemical action to take place and thereafter removing the reaction products.

4. A process of removing paint or varnish coating from coated surfaces, which comprises applying to the surface a liquid comprising a concentrated solution of an alkali metal hydroxid, also containing an alkaline earth metal hydroxid, common salt, an oil capable of masking the odor, the first mentioned three ingredients being present in about the proportions of 32:5.3:2, enough water being present to dissolve said alkali into the form of a concentrated solution, thereafter sprinkling the surface with a small amount of an aqueous liquid, allowing the material to stand a while, and thereafter removing the reaction products.

5. A process of removing paint or varnish coating from coated surfaces, which comprises applying to the surface a liquid comprising an alkali metal hydroxid, and alkaline earth metal hydroxid, common salt, an oil capable of masking the odor and water, thereafter sprinkling the surface with a small amount of an aqueous liquid, scrubbing the surface with an abrasive, allowing the product to stand for a while and thereafter removing the reaction products.

6. A process of loosening paint or varnish coating on a non-horizontal metal surface, which comprises applying to such a surface, a liquid containing an alkali metal hydroxid, an alkaline earth metal hydroxid, common salt and water, in such amount as to substantially cover said coating, thereafter sprinkling a small amount only of aqueous liquid upon such surface, and thereafter removing the reaction products.

In testimony whereof we affix our signatures.

CLAUDE A. KING,
CARL M. WARLICK.